(12) United States Patent
Hull et al.

(10) Patent No.: US 11,313,744 B2
(45) Date of Patent: Apr. 26, 2022

(54) METHOD AND SYSTEM FOR DETECTING DYNAMIC STRAIN

(71) Applicant: Hifi Engineering Inc., Calgary (CA)

(72) Inventors: John Hull, Calgary (CA); Seyed Ehsan Jalilian, Calgary (CA)

(73) Assignee: Hifi Engineering Inc., Calgary (CA)

( * ) Notice: Subject to any disclaimer, the term of this patent is extended or adjusted under 35 U.S.C. 154(b) by 0 days.

(21) Appl. No.: 16/271,623

(22) Filed: Feb. 8, 2019

(65) Prior Publication Data

US 2019/0339145 A1 Nov. 7, 2019

Related U.S. Application Data

(63) Continuation of application No. 15/323,937, filed as application No. PCT/CA2014/050645 on Jul. 4, 2014, now Pat. No. 10,234,345.

(51) Int. Cl.
*G01B 9/02* (2006.01)
*G01L 1/24* (2006.01)
(Continued)

(52) U.S. Cl.
CPC ............ *G01L 1/246* (2013.01); *E21B 47/007* (2020.05); *E21B 47/135* (2020.05); *F17C 13/02* (2013.01);
(Continued)

(58) Field of Classification Search
CPC ... G01L 1/246; E21B 47/0006; E21B 47/123; F17C 13/02; F17D 5/00; G02B 6/02;
(Continued)

(56) References Cited

U.S. PATENT DOCUMENTS 5,513,913 A * 5/1996 Ball .................. G01D 5/35383
250/227.14
6,233,374 B1 5/2001 Ogle et al.
(Continued)

FOREIGN PATENT DOCUMENTS

WO WO2013/102252 A1 7/2013

OTHER PUBLICATIONS

International Search Report and Written Opinion of the International Searching Authority, dated Mar. 9, 2015, for corresponding International Application No. PCT/CA2014/050645, 8 pages.
(Continued)

*Primary Examiner* — Tarifur R Chowdhury
*Assistant Examiner* — Jonathon Cook
(74) *Attorney, Agent, or Firm* — Klarquist Sparkman, LLP (57) ABSTRACT

A system and method for detecting dynamic strain of a housing. The system includes an optical fiber linearly affixed along a surface of a length of the housing and an interrogator comprising a laser source and a photodetector. The optical fiber comprises at least one pair of fiber Bragg gratings (FBGs) tuned to reflect substantially identical wavelengths with a segment of the optical fiber extending between the FBGs. The segment of the optical fiber is linearly affixed along the surface of the housing. The interrogator is configured to perform interferometry by shining laser light along the optical fiber and detecting light reflected by the FBGs. The interrogator outputs dynamic strain measurements based on interferometry performed on the reflected light.

11 Claims, 8 Drawing Sheets

(51) Int. Cl.
   *E21B 47/007*   (2012.01)
   *E21B 47/135*   (2012.01)
   *G02B 6/02*     (2006.01)
   *F17D 5/00*     (2006.01)
   *F17C 13/02*    (2006.01)

(52) U.S. Cl.
   CPC ............... *F17D 5/00* (2013.01); *G02B 6/02* (2013.01); *G02B 6/0208* (2013.01); *G02B 6/02395* (2013.01)

(58) Field of Classification Search
   CPC .. G02B 6/0208; G02B 6/02395; G01B 11/16; G01B 11/18; G01B 11/161; G01B 11/165; G01D 5/35383; G01D 5/35387; G01D 5/35393
   See application file for complete search history.

(56) References Cited

U.S. PATENT DOCUMENTS

| | | | |
   |---|---|---|---|
   | 6,785,004 | B2 | 8/2004 | Kersey et al. |
   | 6,840,114 | B2 | 1/2005 | Niezgorski et al. |
   | 7,789,214 | B2 | 9/2010 | Bergeron et al. |
   | 7,920,270 | B2 | 4/2011 | Chow et al. |
   | 2002/0025097 | A1 | 2/2002 | Cooper et al. |
   | 2002/0064330 | A1 | 5/2002 | Croteau et al. |
   | 2002/0176647 | A1 | 11/2002 | Spirin et al. |
   | 2003/0038231 | A1 | 2/2003 | Bryant et al. |
   | 2006/0045408 | A1 | 3/2006 | Jones et al. |
   | 2006/0187534 | A1* | 8/2006 | Hodder ............... G01D 5/35383 359/333 |
   | 2008/0281209 | A1 | 11/2008 | Arkwright et al. |
   | 2009/0326826 | A1 | 12/2009 | Hull et al. |
   | 2011/0110621 | A1* | 5/2011 | Duncan ............... E21B 47/06 385/13 |
   | 2012/0099097 | A1 | 4/2012 | Coupe et al. |
   | 2012/0143525 | A1 | 6/2012 | Chen et al. |
   | 2014/0150563 | A1 | 6/2014 | Lambert et al. |
   | 2014/0152995 | A1* | 6/2014 | Dong ............... G01L 1/246 356/477 |
   | 2015/0322769 | A1 | 11/2015 | Ruffa |
   | 2016/0123715 | A1 | 5/2016 | Froggatt et al. |
   | 2017/0153154 | A1 | 6/2017 | Hull et al. |

OTHER PUBLICATIONS

International Search Report and Written Opinion of the International Searching Authority, dated Apr. 1, 2015, for corresponding International Application No. PCT/CA2014/050644, 8 pages.
   Office Action from the United States Patent & Trademark Office in co-pending U.S. Appl. No. 15/323,937, dated Oct. 19, 2017.
   Office Action from the United States Patent & Trademark Office in co-pending U.S. Appl. No. 15/323,932, dated Apr. 19, 2018.
   Office Action from the United States Patent & Trademark Office in co-pending U.S. Appl. No. 15/323,937, dated May 16, 2018.
   Notice of Allowance from the United States Patent & Trademark Office in co-pending U.S. Appl. No. 15/323,937, dated Nov. 1, 2018.
   Office Action from the United States Patent & Trademark Office in co-pending U.S. Appl. No. 16/358,066, dated Mar. 19, 2021.
   Notice of Allowance from the United States Patent & Trademark Office in co-pending U.S. Appl. No. 16/358,066, dated Sep. 29, 2021.

* cited by examiner

METHOD AND SYSTEM FOR DETECTING DYNAMIC STRAIN

CROSS REFERENCE TO RELATED APPLICATIONS

This is a continuation of U.S. patent application Ser. No. 15/323,937, filed Jan. 4, 2017, which is the U.S. National Stage of International Application No. PCT/CA2014/050645, filed Jul. 4, 2014, both of which are hereby incorporated by reference.

TECHNICAL FIELD

The present disclosure is directed at methods, systems, and techniques for detecting dynamic strain.

BACKGROUND

In a variety of industries, such as the oil and gas industry, the effect of dynamic strain on various components may be material for determining whether those components are functioning properly and for forecasting the expected life of those components. Dynamic strain may also be monitored for detecting failures in components such as well casing and pipelines. Research and development accordingly continue into methods, systems and techniques for detecting dynamic strain.

SUMMARY

According to a first aspect, there is provided a system for detecting dynamic strain of a housing. The system comprises an optical fiber linearly affixed along a surface of a length of the housing and an interrogator. The optical fiber comprises at least one pair of fiber Bragg gratings (FBGs) tuned to reflect substantially identical wavelengths with a segment of the optical fiber extending between the FBGs. The segment of the optical fiber is linearly affixed along the surface of the housing. The interrogator comprises a laser source and a photodetector. The interrogator is configured to perform interferometry by shining laser light along the optical fiber and detecting light reflected by the FBGs. The interrogator outputs dynamic strain measurements based on interferometry performed on the reflected light.

The system may further comprise a signal processing device communicative with the interrogator. The signal processing device may be configured to process the dynamic strain measurements to estimate where along the housing the dynamic strain is occurring. The signal processing device may be configured to process the dynamic strain measurements to estimate magnitude of the dynamic strain. The signal processing device may be configured to process the dynamic strain measurements and monitor changes in frequency of dynamic strain.

The optical fiber may comprise first and second pairs of the FBGs. The FBGs of the first pair may be tuned to a first wavelength and the FBGs of the second pair may be tuned to a second wavelength different from the first wavelength. The segments of the optical fiber between the first pair of FBGs and the second pair of FBGs may be linearly affixed along the surface of different lengths of the housing. The interrogator may be configured to use wavelength division multiplexing to measure dynamic strain at the different lengths of the housing.

The optical fiber may be linearly affixed directly to the surface of the length of the housing. A plurality of fasteners may be used to affix the optical fiber directly to the surface of the length of the housing. The surface of the length of the housing may comprises a longitudinally extending linear groove in which the optical fiber is positioned. A coating material may coat the optical fiber positioned in the linear groove.

The optical fiber may be linearly affixed to a lining on the surface of the length of the housing. A plurality of fasteners may be used to linearly affix the optical fiber to the lining. The lining may comprise a longitudinally extending linear groove in which the optical fiber is positioned. A coating material may coat the optical fiber positioned in the linear groove.

The optical fiber may be enclosed in a protective shell. The protective shell may comprise a metal tube.

The housing may be a conduit. Alternatively, the housing may be a vessel.

According to another aspect, there is provided a method for detecting dynamic strain of a housing. the method comprises: shining laser light along an optical fiber linearly affixed along a surface of a length of the housing, wherein the optical fiber comprises at least one pair of fiber Bragg gratings (FBGs) tuned to reflect substantially identical wavelengths with a segment of the optical fiber extending between the FBGs, wherein the segment of the optical fiber is linearly affixed along the surface of the housing; and detecting light reflected by the FBGs and performing interferometry on the reflected light to produce dynamic strain measurements based on the interferometry.

The method may further comprises processing the measurements to estimate where along the housing the dynamic strain is occurring.

The method may further comprises processing the measurements to estimate magnitude of the dynamic strain.

The method may further comprises processing the measurements to monitor changes in frequency of the dynamic strain.

According to another aspect, there is provided a system for detecting dynamic strain. The system comprises: an optical fiber comprising at least one pair of fiber Bragg gratings (FBGs) tuned to reflect substantially identical wavelengths with a segment of the optical fiber linearly extending between the FBGs; and an interrogator comprising a laser source and a photodetector. The interrogator is configured to perform interferometry by shining laser light along the optical fiber and detecting light reflected by the FBGs. and the interrogator outputs dynamic strain measurements based on interferometry performed on the reflected light.

The interrogator may comprise an optical source and a photodetector and may be configured to: shine a reference light pulse and a sensing light pulse along the optical fiber and control timing of the light pulses such that the reference light pulse is delayed compared to the sensing light pulse by a predetermined period of time selected such that the reference light pulse reflected by a first FBG of the pair of FBGs interferes with the sensing light pulse reflected by a second FBG of the pair of FBGs to form a combined interference pulse: detect a phase difference between the reflected reference light pulse and the reflected sensing light pulse of the combined interference pulse; and produce an output signal based on the phase difference detected.

The system may further comprise a signal processing device communicative with the interrogator. The signal processing device may be configured to process the dynamic strain measurements to estimate where the dynamic strain is occurring. The signal processing device may be configured to process the dynamic strain measurements to estimate magnitude of the dynamic strain. The signal processing device may be configured to process the dynamic strain measurements and monitor changes in frequency of dynamic strain.

The optical fiber may comprise first and second pairs of the FBGs. The FBGs of the first pair may be tuned to a first wavelength and the FBGs of the second pair may be tuned to a second wavelength different from the first wavelength. The interrogator may be configured to use wavelength division multiplexing to measure dynamic strain.

The optical fiber may be enclosed in a protective shell. The protective shell may comprise a metal tube.

According to another aspect, there is provided a method for detecting dynamic strain, comprising: shining laser light along an optical fiber, wherein the optical fiber comprises at least one pair of fiber Bragg gratings (FBGs) tuned to reflect substantially identical wavelengths with a segment of the optical fiber linearly extending between the FBGs; and detecting light reflected by the FBGs and performing interferometry on the reflected light to produce dynamic strain measurements based on the interferometry.

The shining laser light step may comprise shining a reference light pulse and a sensing light pulse along the optical fiber, the reference light pulse being delayed compared to the sensing light pulse by a predetermined period of time selected such that the reference light pulse reflected by a first FBG of the pair of FBGs interferes with the sensing light pulse reflected by a second FBG of the pair of FBGs to form a combined interference pulse. The detecting light reflected by the FBGs and performing interferometry step may comprise detecting the combined interference pulse and detecting a phase difference between the reflected reference light pulse and the reflected sensing light pulse of the combined interference pulse to produce the dynamic strain measurements.

The method may further comprise processing the measurements to estimate where the dynamic strain is occurring.

The method may further comprise processing the measurements to estimate magnitude of the dynamic strain.

The method may further comprise processing the measurements to monitor changes in frequency of the dynamic strain.

The optical fiber may be deployed within a housing. The housing may be production tubing of a wellbore. Alternatively the housing may be a pipeline.

According to another aspect, there is provided a method for detecting dynamic strain in a housing, comprising: shining a reference light pulse and a sensing light pulse along an optical fiber deployed within the housing, wherein the optical fiber comprises at least one pair of fiber Bragg gratings (FBGs) tuned to reflect substantially identical wavelengths with a segment of the optical fiber extending between the FBGs, wherein the reference light pulse is delayed compared to the sensing light pulse by a predetermined period of time selected such that the reference light pulse reflected by a first FBG of the pair of FBGs interferes with the sensing light pulse reflected by a second FBG of the pair of FBGs to form a combined interference pulse: and detecting the combined interference pulse and detecting a phase difference between the reflected reference light pulse and the reflected sensing light pulse of the combined interference pulse to produce dynamic strain measurements based on the phase difference detected.

The housing may be production tubing of a wellbore. Alternatively, the housing may be a pipeline.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments.

DETAILED DESCRIPTION

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment.

Optical interferometry is a technique in which two separate light pulses are generated: a sensing pulse and a reference pulse. These pulses may be generated by an optical source such as a laser. When optical interferometry is used for fiber optic sensing applications, the sensing and reference pulses are at least partially reflected back towards an optical receiver. As described in further detail below, optical interferometry may be used to detect dynamic strain.

Figure 1A:
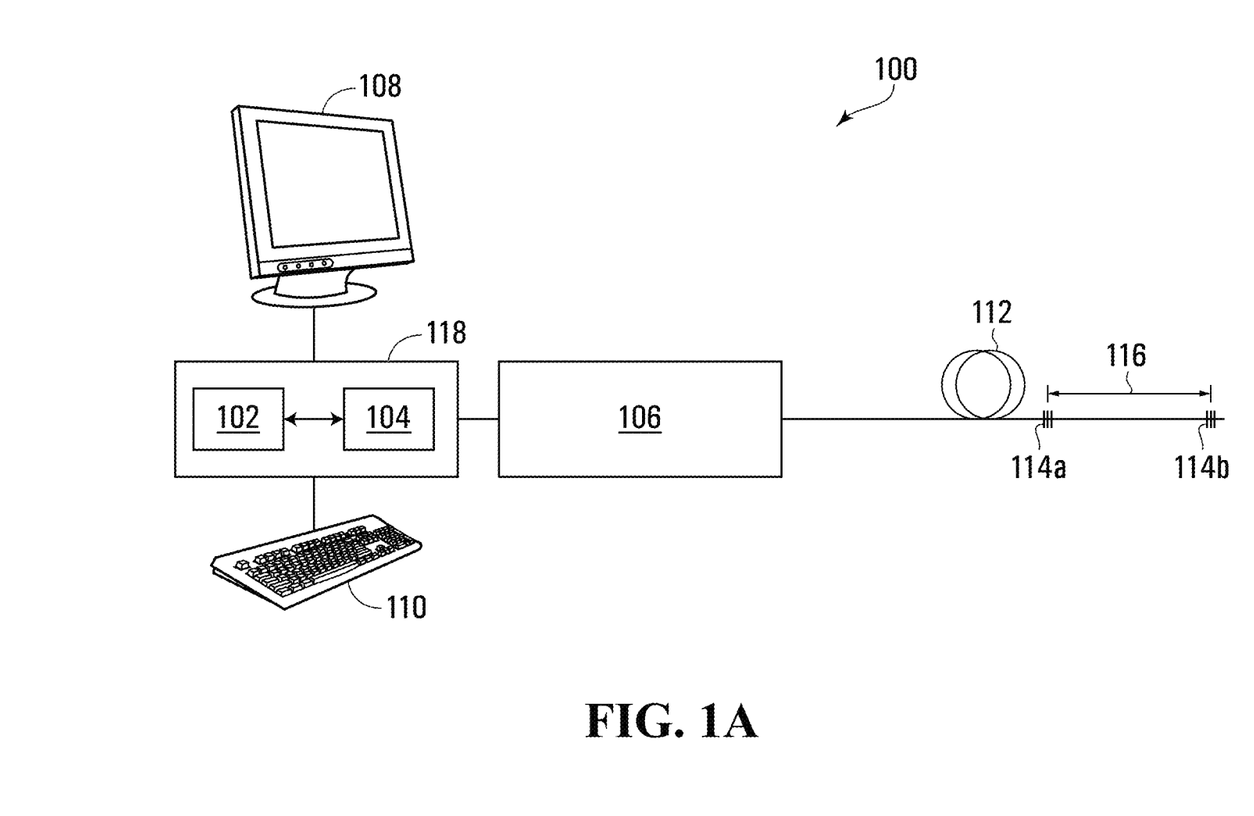
FIG. 1A is a block diagram of a system for detecting dynamic strain, which includes an optical fiber with fiber Bragg gratings ("FBGs") for reflecting a light pulse, according to one embodiment.

Referring now to FIG. 1A, there is shown one embodiment of a system 100 for detecting dynamic strain. The system 100 comprises the optical fiber 112, an interrogator 106 optically coupled to the optical fiber 112, and a signal processing device 118 that is communicative with the interrogator 106. While not shown in FIG. 1A, within the interrogator 106 are an optical source, optical receiver, and an optical circulator. The optical circulator directs light pulses from the optical source to the optical fiber 112 and directs light pulses received by the interrogator 106 from the optical fiber 112 to the optical receiver.

The optical fiber 112 comprises one or more fiber optic strands, each of which is made from quartz glass (amorphous $SiO_2$). The fiber optic strands are doped with a rare earth compound (such as germanium, praseodymium, or erbium oxides) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfiniCor® series multimode fibers.

The interrogator 106 generates the sensing and reference pulses and outputs the reference pulse after the sensing pulse. The pulses are transmitted along optical fiber 112 that comprises a first pair of fiber Bragg gratings ("FBGs"). The first pair of FBGs comprises first and second FBGs 114a,b (generally. "FBGs 114"). The first and second FBGs 114a,b are separated by a certain segment 116 of the optical fiber 112 ("fiber segment 116"). The optical length of the fiber segment 116 varies in response to dynamic strain that the optical fiber 112 experiences.

The light pulses have a wavelength identical or very close to the center wavelength of the FBGs 114, which is the wavelength of light the FBGs 114 are designed to partially reflect; for example, typical FBGs 114 are tuned to reflect light m the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in alternative embodiments (not depicted) any number of FBGs 114 may be on the fiber 112, and time division multiplexing (TDM) (and optionally, wavelength division multiplexing (WDM)) may be used to simultaneously obtain measurements from them. If two or more pairs of FBGs 114 are used, any one of the pairs may be tuned to reflect a different center wavelength than any other of the pairs. Alternatively a group of multiple FBGs 114 may be tuned to reflect a different center wavelength to another group of multiple FBGs 114 and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the optical source 101. When different pairs of the FBGs 114 are not tuned to different center wavelengths, TDM is sufficient.

The interrogator 106 emits laser light with a wavelength selected to be identical or sufficiently near the center wavelength of the FBGs 114 that each of the FBGs 114 partially reflects the light back towards the interrogator 106. The timing of the successively transmitted light pulses is such that the light pulses reflected by the first and second FBGs 114a,b interfere with each other at the interrogator 106, and the optical receiver 103 records the resulting interference signal. The strain that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 118 includes a processor 102 and a non-transitory computer readable medium 104 that are communicatively coupled to each other. An input device 110 and a display 108 interact with the processor 102. The computer readable medium 104 has encoded on it statements and instructions to cause the processor 102 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. The processor 102 may apply a low pass filter with a cutoff frequency of 20 Hz to the output signal to isolate the vibration portion of the output signal from the acoustics portion of the output signal. Analogously, to isolate the acoustics portion of the output signal from the vibration portion, the processor 102 may apply a high pass filter with a cutoff frequency of 20 Hz. The processor 102 may also apply more complex signal processing methods to the output signal; example methods include those described in PCT application PCT/CA2012/000018 (publication number WO 2013/102252), the entirety of which is hereby incorporated by reference.

Figure 1B:
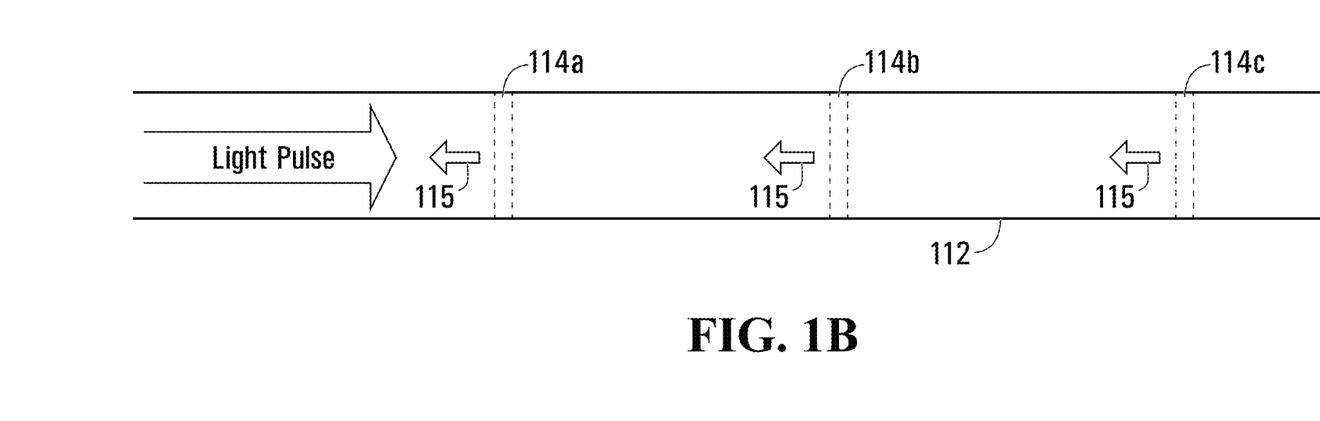
FIG. 1B is a schematic that depicts how the FBGs reflect a light pulse.

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the optical receiver 101. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect strain along the fiber 112 occurring further from the optical source 101 than the second FBG 114b. For example, in the embodiment of FIG. 1B, a portion of the sensing pulse not reflected by the first and second FBGs 114a,b can reflect off the third FBG 114c and a portion of the reference pulse not reflected by the first FBG 114a can reflect off the second FBG 114b, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference (θ) is as follows:

$$\theta = \frac{2\pi nL}{\lambda}$$

where n is the index of refraction of the optical fiber; L is the optical path length of the fiber segment 116; and λ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain", refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 µHz, is referred to as "sub-Hz strain".

Figure 1C:
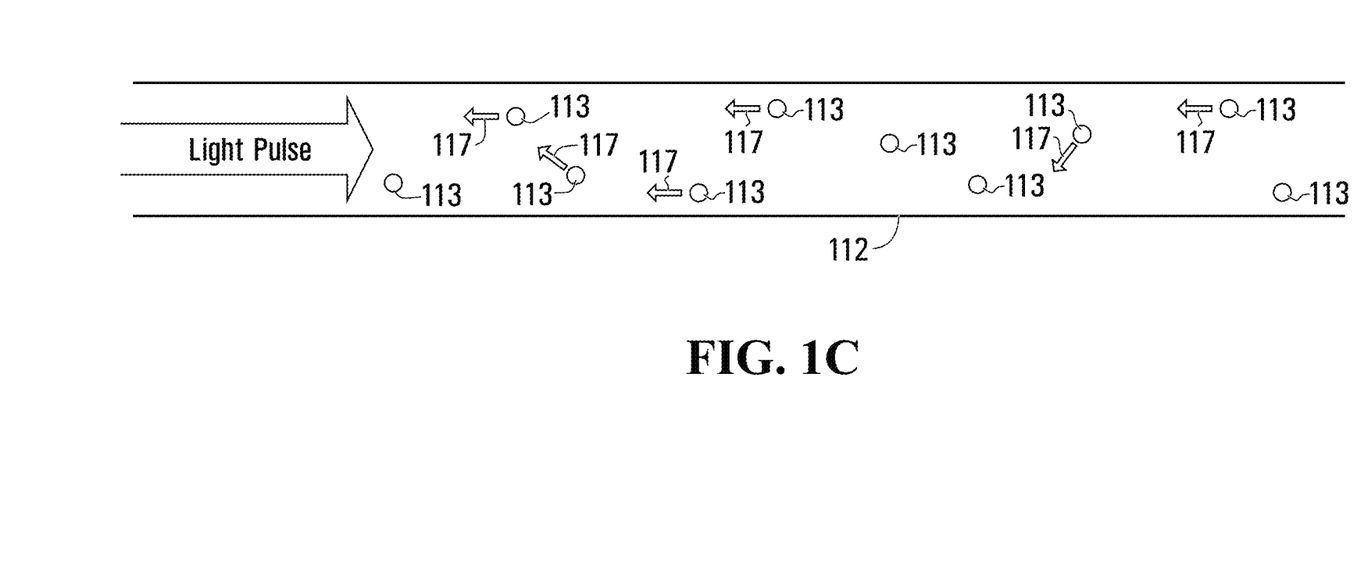
FIG. 1C is a schematic that depicts how a light pulse interacts with impurities in an optical fiber that results in scattered laser light due to Rayleigh scattering, which is used for distributed acoustic sensing ("DAS").

One conventional way of determining ΔnL is by using what is broadly referred to as distributed acoustic sensing ("DAS"). DAS involves laying the fiber 112 through or near a region of interest and then sending a coherent laser pulse along the fiber 112. As shown in FIG. 1C, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits less light back towards the optical receiver 103 than using the FBGs 114.

DAS accordingly uses Rayleigh scattering to estimate the magnitude, with respect to time, of the strain experienced by the fiber during an interrogation time window, which is a proxy for the magnitude of the vibration or acoustics emanating from the region of interest. In contrast, the embodiments described herein measure dynamic strain using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of 2% or 5%. The use of FBG-based interferometry to measure dynamic strain offers several advantages over DAS, in terms of optical performance.

In some of the presently disclosed embodiments, optical fiber 112 is linearly affixed along a surface of a length of housing to detect dynamic strain of the housing. The optical fiber 112 including fiber segments 116 positioned between pairs of FBGs 114 longitudinally extends along the surface of the housing with the fiber segments 116 linearly affixed along the housing surface. When the housing is subjected to dynamic strain caused by vibration or sound, this results in corresponding strain or pull on the fiber segments 116. The optical length of the fiber segment 116 varies in response to the amount of strain the fiber 112 is experiencing and thus changes the interference pattern produced by the FBGs 114 and recorded by the interrogator 106 as discussed above in more detail. The fiber 112 may be linearly affixed along substantially the whole length of the housing or a portion thereof. The fiber 112 may be linearly affixed to the external or internal surface of the housing. The fiber 112 may be in direct contact with the housing surface or it may be on or embedded in some sort of lining or carrier on the internal or external surface of the housing. The housing surface may comprise a longitudinally extending linear groove along a length of the housing surface and the optical fiber 112 may be positioned in the groove. A protective coating or filler may be provided over the optical fiber 112 to fill any space within the groove and to protect the fiber from damage. Alternatively the optical fiber 112 may be enclosed in a protective shell for example a metal tube such as a stainless steel tube. The optical fiber 112 (optionally enclosed in the protective shell) may be linearly affixed to the housing or lining by a plurality of fasteners, such as zip or cable ties, tape, cable clips, cable mounts or the like.

As the optical fiber 112 is linearly affixed along a surface of the housing, the optical fiber 112 may be enclosed in a protective shell such as a stainless steel tube as described above and the protective shell may be of a thickness and stiffness that reduces or does not permit bending of the optical fiber 112 in order to protect the optical fiber 112. In one example embodiment, the optical fiber 112 is enclosed within a ¼ inch stainless steel tubing.

The housing may be a vessel, such as a fluid storage vessel. Alternatively the housing may be a conduit of any cross-sectional shape or size, for example a tubular, pipeline, or the like through which fluid flows. A fiber optic cable may be positioned inside the conduit for sensing conditions within the conduit. For example, the fiber optic cable may be made up of a plurality of fiber optic strands which may include a distributed temperature sensing ("DTS") transmission line as is known in the art and described in US 2009/0326826 (incorporated herein by reference).

Dynamic strain may be monitored using the system and method of the disclosed embodiments to provide an indication that fluid is leaking from the housing. Dynamic strain may also be monitored to identify hotspots in a housing, which hotspots are experiencing strain over time and are more likely to fail. In addition, dynamic strain may be monitored for many other applications such as geosteering, pipeline collision detection, and pig tracking as is known in the art.

Figure 2A:
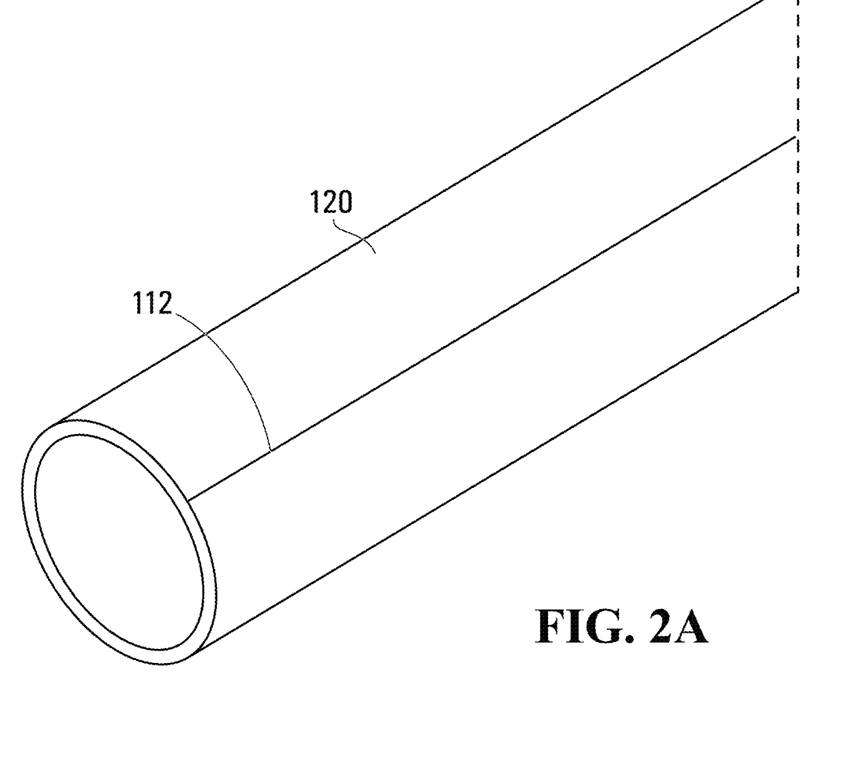
FIG. 2A is a perspective view of a conduit with an optical fiber linearly affixed to an outer surface of the conduit for detecting dynamic strain of the conduit according to one embodiment.
Figure 2B:
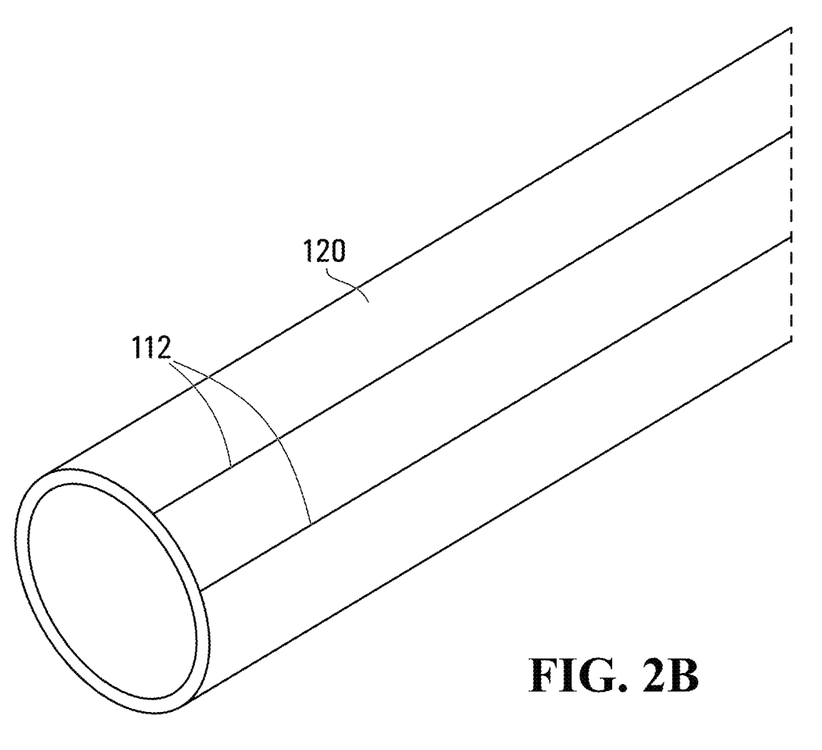
FIG. 2B is a perspective view of a conduit with multiple optical fibers linearly affixed in parallel alignment to an outer surface of the conduit for detecting dynamic strain of the conduit according to one embodiment.

Referring now to FIGS. 2A and 2B there are shown embodiments of a conduit 120 with longitudinally extending optical fiber 112 linearly affixed along the outer surface of the conduit 120. The optical fiber 112 is in direct contact with the conduit 120. The optical fiber 112 is linearly affixed along substantially the entire length of the conduit 120, however in alternative embodiments (not shown) the optical fiber 112 may be linearly affixed along a portion of the length of the conduit 120. The optical fiber 112 is linearly affixed along the outer surface of the conduit 120, however in alternative embodiments (not shown) the optical fiber 112 may be linearly affixed along the internal surface of the conduit 120. In FIG. 2A a single optical fiber 112 is linearly affixed along the outer surface of the conduit 120, whereas in FIG. 2B multiple optical fibers 112 are in longitudinal parallel alignment around the circumference of the conduit 120, with each optical fiber 112 linearly affixed along the outer surface of the conduit 120. In an alternative embodiment (not shown) multiple optical fibers 112 may be linearly affixed along the internal surface of the conduit 120 or other housing with the fibers 112 being in longitudinal parallel alignment. Provision of multiple optical fibers 112 positioned in longitudinal parallel alignment along the surface of the housing may provide more comprehensive detection of dynamic strain from the area surrounding the internal or internal surface of the housing as the dynamic strain will be detected by optical fiber 112 in closest alignment with the source of the dynamic strain.

Figure 3:
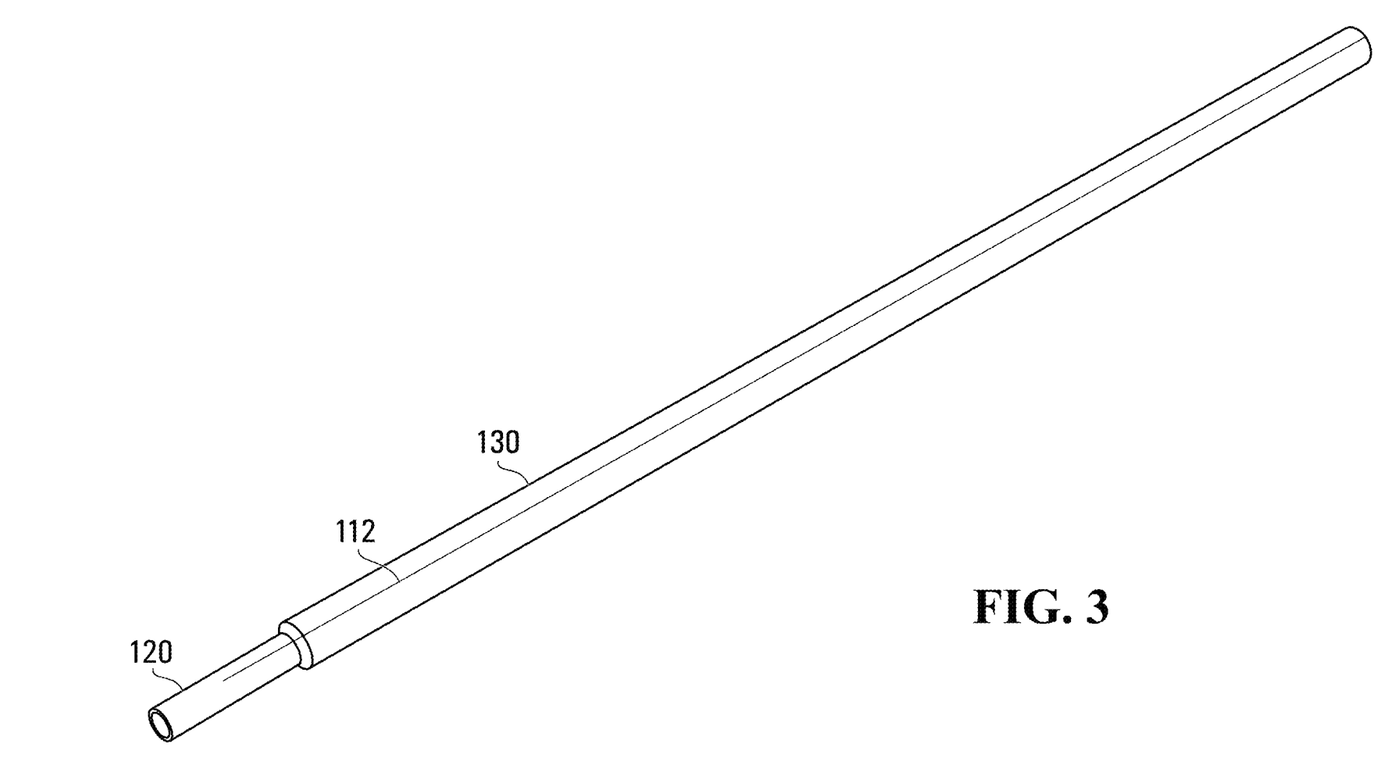
FIG. 3 is a perspective view of a conduit with a lining surrounding the conduit and an optical fiber linearly affixed to the lining for detecting dynamic strain of the conduit according to one embodiment.

Referring now to FIG. 3, there is shown an embodiment of a conduit 120 with a lining or carrier 130 surrounding the conduit 120 and optical fiber 112 linearly embedded in the lining 130. The lining 130 may be extruded over the conduit 120 or wrapped or laid around the external surface of the conduit 120 using methods known in the art. Alternatively, the lining 130 may be positioned on the internal surface of the conduit 120. The lining 130 includes a longitudinally extending linear groove in the outer surface of the lining 130. The groove receives the optical fiber 112 and a protective filler or coating (not shown) may be coated over the fiber 112 to fill any spaces within the groove. In an alternative embodiment (not shown), the filler may not be provided. The depth of the groove is such that the fiber 112 is below or flush with the outer surface of the lining 130, which, together with the protective coating 132, may beneficially protect the fiber 112 and may prevent snagging of the fiber 112. In another alternative embodiment, the groove may not be provided on the surface of the lining 130 and the optical fiber 112 may be linearly affixed directly to the lining surface or embedded in the lining 130 in some other way, such as extruding the lining 130 with the fiber 112.

The lining 130 may be made of a material that is able to transmit dynamic strain, so as not to hinder the fiber's ability to detect dynamic strain of the housing. The lining material selected should also have sufficient tensile strength to allow the material to be stretched in response to dynamic strain without breaking or failing. Suitable materials for the lining 130 include, but are not limited to, plastics, for example high temperature and formable plastics. The filler or coating may be a formable or curable material, such as a formable plastic, or a thermoset, thermoplastic or UV cured elastomer, which can expand to fill the groove. The filler material selected may have a coefficient of expansion corresponding to the coefficient of expansion of the lining material.

The system and method disclosed herein may be used to monitor changes in frequency of dynamic strain of the housing. Alternatively, or additionally, the system may be used to monitor changes in magnitude of dynamic strain of the housing. A change in magnitude of dynamic strain may indicate stretch, compression, elongation or shear of the housing. The magnitude of dynamic strain may also indicate severity of the strain being applied to the housing, for example, the larger the strain being applied to the housing, the greater the magnitude of dynamic strain. It follows that the more severe the strain being applied at a particular location of the housing, the more likely the housing will be compromised and fail in the future.

Figure 4:
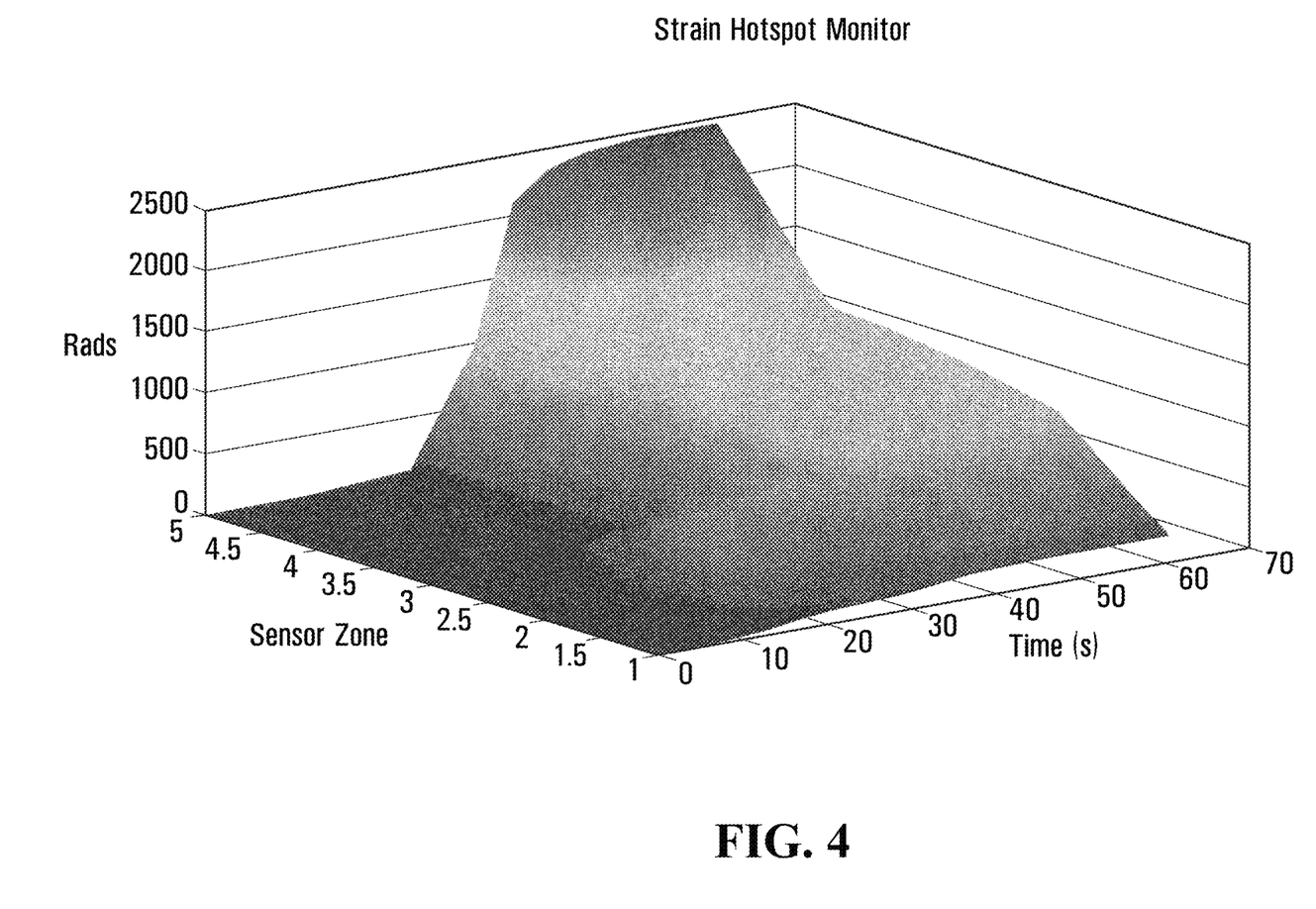
FIG. 4 depicts a graph of cumulative dynamic strain at various locations along a housing vs. time.

The system and method disclosed herein may be used to monitor cumulative strain of the housing where the dynamic strain is monitored over time. FIG. 4 shows an exemplary graph of cumulative dynamic strain at various locations along a housing vs. time. The cumulative dynamic strain represented by the graph is measured using an optical fiber 112 comprising pairs of FBGs 114 representing five sensor zones (zones 1-5). The sensor zones and time are given on the horizontal axes and the vertical axes shows the total accumulated strain (rads). For the first five seconds, the housing is under no strain. Strain is first applied to zone 1 (hence the initial rise in the cumulative strain in this zone). Then at about ten seconds, strain is applied to zone 5, resulting in an increase in the accumulated strain in zone 5. No further strain is introduced to the system, resulting in a leveling off of the accumulated strain graph. Strain is a unitless measurement and is relative rather than absolute. As such, the system may be calibrated and strain correlated to a recognized measurement such as displacement or applied force or pressure. Cumulative strain can be used to provide an indication of when it is time for the operator to replace the housing by comparing the cumulative strain to a predetermined reference value.

Figure 5:
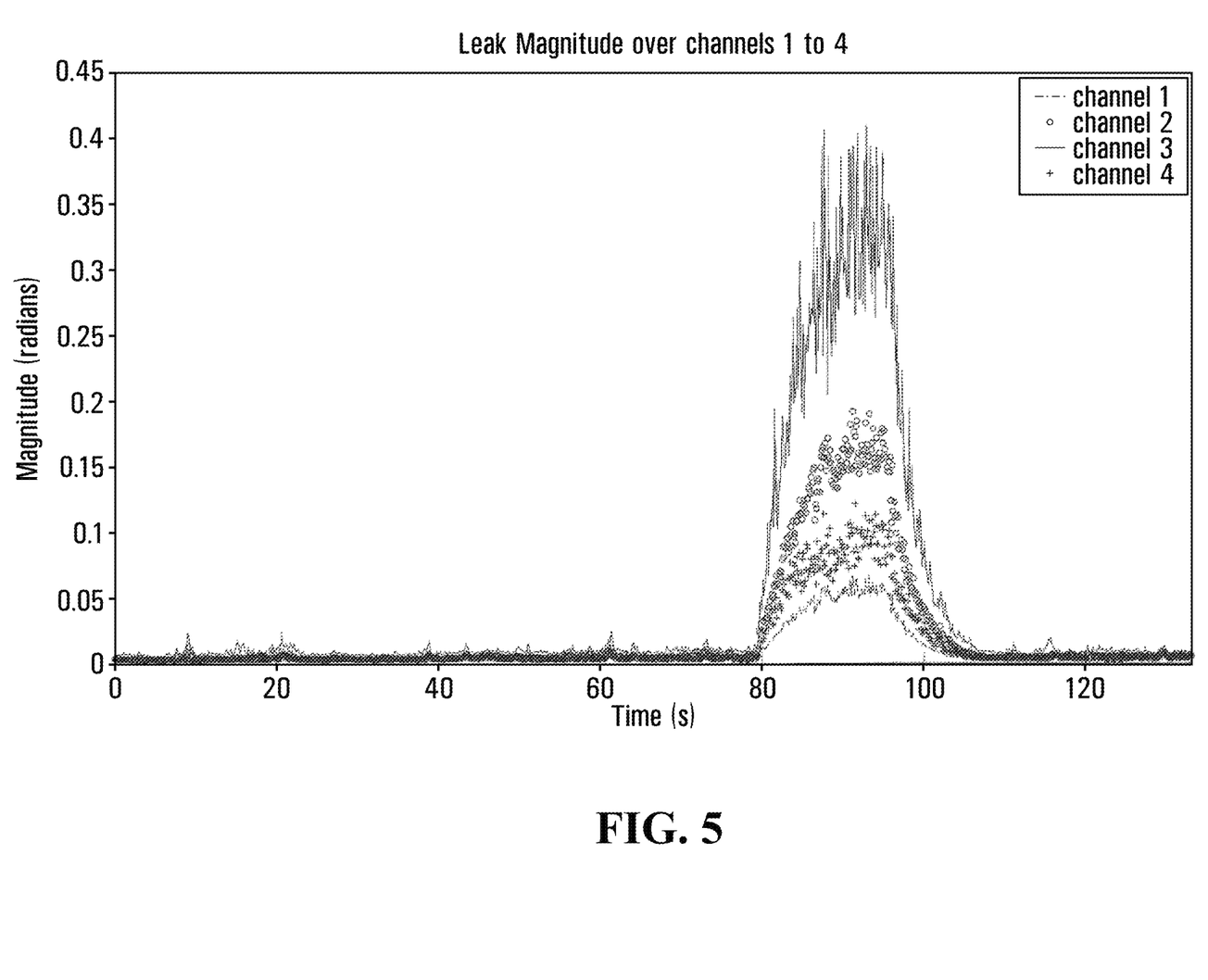
FIG. 5 depicts a graph of magnitude of dynamic strain vs. time for segments of an optical fiber (channels 1-4) linearly affixed along an external surface of a conduit, each of the segments of the optical fiber extending linearly between a pair of FBGs (channels 1-4).

The system and method may be used to estimate where along the housing the dynamic strain is occurring. This may be useful to provide an indication of where a leak is occurring, or is likely to occur, or for other uses as is known in the art such as monitoring steam injection in a nearby production well. FIG. 5 shows an exemplary graph of magnitude of strain (radians) over time for different fiber segments 116 (channels 1-4) of an optical fiber 112 linearly affixed along an external surface of a conduit. The greatest magnitude of strain is detected by the channel 3 fiber segment with channel 2 fiber segment and channel 4 fiber segment positioned either side of channel 3 fiber segment having the next largest magnitude of strain. Channel 1 fiber segment is furthest away from channel 3 fiber segment and has the smallest magnitude of strain. This graph indicates that there is dynamic strain in the vicinity of where the channel 3 fiber segment is affixed to the housing. The dynamic strain may be a leak in the housing or something else that causes the dynamic strain such as steam injection in a nearby production well. This dynamic strain is transient causing a spike in the magnitude of dynamic strain.

In other embodiments, the optical fiber 112 comprises at least one pair of FBGs 114 tuned to reflect substantially identical wavelengths with fiber segment 116 linearly extending between the FBGs 114. The optical fiber 112 may comprise multiple pairs of FBGs 114 or groups of multiple FBGs 114 as described above with the fiber segments 116 linearly extending between the FBGs 114. The optical fiber 112 may be enclosed in a protective shell for example a metal tube such as a stainless steel tube to protect the optical fiber 112. In these embodiments the optical fiber 112 is used with interrogator 106 in a method and system to detect dynamic strain as described above.

The method and system may be used to detect and monitor dynamic strain of, or in, a variety of housings over large or small distances. For example the optical fiber 112 may be deployed in a housing for detecting dynamic strain in the housing. In addition, the optical fiber 112 may be positioned outside the housing, for example within a few meters from the exterior surface of the housing. For example, the housing may be a pipeline and the optical fiber 112 may be buried in the ground near the pipeline to detect acoustics of the pipeline. The optical fiber 112 may be buried between two pipelines (for example equidistance between both pipelines) and used to detect acoustics in both pipelines. The housing may be a vessel, such as a fluid storage vessel. Alternatively, the housing may be a conduit of any cross-sectional shape or size, for example a tubular, pipeline, or casing of an oil and gas well. The method and system may also be used to detect and monitor dynamic strain of a physical area over large or small distances, for example a perimeter of a building, an oil and gas well, or any area, where the optical fiber 112 is deployed in the physical area being monitored.

Dynamic strain may be monitored to provide an indication that fluid is leaking from a housing, such as a conduit or vessel. Dynamic strain may also be monitored to identify hotspots in a housing, which hotspots are experiencing strain over time and are more likely to fail. Dynamic strain may also be monitored for many other applications such as geosteering, pipeline collision detection, and pig tracking as is known in the art.

The system and method may be used to monitor changes in frequency of dynamic strain of a housing. Alternatively, or additionally, the system and method may be used to monitor changes in magnitude of dynamic strain of a housing. A change in magnitude of dynamic strain may indicate stretch, compression, elongation or shear of the housing. The magnitude of dynamic strain may also indicate severity of the strain being applied to the housing, for example, the larger the strain being applied to the housing, the greater the magnitude of dynamic strain. It follows that the more severe the strain being applied at a particular location of the housing, the more likely the housing will be compromised and fail in the future at that location. The method and system may be used to estimate where along the housing the dynamic strain is occurring. This may be useful to provide an indication of where a leak is occurring, or is likely to occur, or for other uses as is known in the art.

Figure 6:
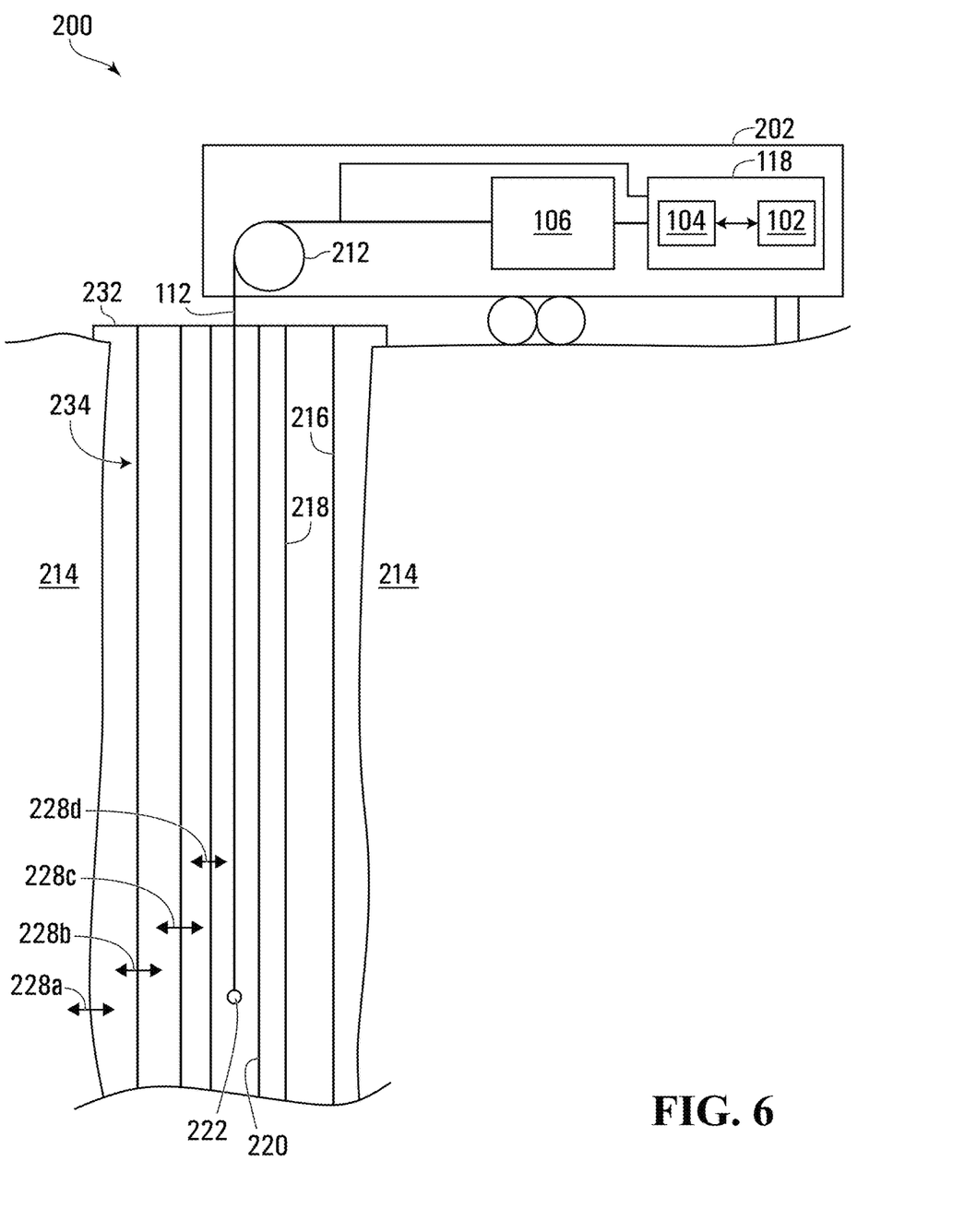
FIG. 6 is a schematic of a system for detecting dynamic strain in a wellbore using the optical fiber with FBGs according to one embodiment.

Referring now to FIG. 6, there is shown a schematic of a system 200 for detecting dynamic strain within a wellbore, according to another embodiment. In FIG. 6, a wellbore 234 is drilled into a formation 214 that contains oil or gas deposits (not shown). Various casing and tubing strings are then strung within the wellbore 234 to prepare it for production. In FIG. 6, surface casing 216 is the outermost string of casing and circumscribes the portion of the interior of the wellbore 234 shown in FIG. 6. A string of production casing 218 with a smaller radius than the surface casing 216 is contained within the surface casing 216, and an annulus (unlabeled) is present between the production and surface casings 218, 216. A string of production tubing 220 is contained within the production casing 218 and has a smaller radius than the production casing 218, resulting in another annulus (unlabeled) being present between the production tubing and casing 220, 218. The surface and production casings 216, 218 and the production tubing 220 terminate at the top of the wellbore 234 in a wellhead 232 through which access to the interior of the production tubing 220 is possible.

Although the wellbore 234 in FIG. 6 shows only with the production and surface casings 218, 216 and the production tubing 220, in alternative embodiments (not shown) the wellbore 234 may be lined with more, fewer, or alternative types of tubing or casing. For example, in one such alternative embodiment a string of intermediate casing may be present in the annulus between the surface and production casings 216, 218. In another such alternative embodiment in which the wellbore 234 is pre-production, only the surface casing 216, or only the surface and production casings 216, 218, may be present.

FIG. 6 also shows four examples of leaks 228a-d (collectively, "leaks 228") that result in dynamic strain. One of the leaks 228a is of fluid crossing the formation 214's surface. Another of the leaks 228b is of fluid crossing the surface casing 216, while a third leak 228c is of fluid crossing the production casing 218, and a fourth leak 228d is of fluid crossing the production tubing 220. Although not depicted in FIG. 6, fluid flowing into the formation 214 from the wellbore 234 can also constitute a leak. As mentioned above, in alternative embodiments (not shown) the wellbore 234 may contain more, fewer, or other types of casing or tubing strings, and in such embodiments the leaks may result from fluid crossing any or more of these strings.

Optical fiber 112 is lowered into the production tubing 220 by spooling device 212. The optical fiber 112 comprises at least one pair of FBGs 114 tuned to reflect substantially identical wavelengths with fiber segment 116 linearly extending between the FBGs 114. The optical fiber 112 may comprise multiple pairs of FBGs 114 or groups of multiple FBGs 114 as described above. The optical fiber 112 may be enclosed in a protective shell for example a metal tube such as a stainless steel tube to protect the optical fiber 112. At the end of the optical fiber 112 is a weight 222 to help ensure the optical fiber 112 is relatively taut during well logging.

As described above, the interrogator 106 generates sensing and reference pulses which are transmitted along the optical fiber 112 that comprises at least one pair of FBGs 114 separated by a fiber segment 116. The optical length of the fiber segment 116 varies in response to dynamic strain that the optical fiber 112 experiences caused by leaks 228a-d or another source of dynamic strain. The sensing and reference pulses are each partially reflected by the FBGs 114 and return to the interrogator 106 resulting in interference of the reflected sensing and reference pulses as described above with reference to FIGS. 1A and 1B. The interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences. The signal processing device 118 is communicatively coupled to the interrogator 106 to receive the output signal. The signal processing device 118 includes processor 102 and computer readable medium 104 that are communicatively coupled to each other as described above with reference to FIG. 1A. The signal processing device 118 processes the output signals received by the interrogator 106 to provide an indication of where in the wellbore the dynamic strain is occurring and this information may be used to indentify leaks 228a-d. Housing 202 positioned on the surface houses the spooling device 212, interrogator 106 and signal processing device 118.

The system 200 may also be used to monitor changes in frequency of dynamic strain in the wellbore 234. Alternatively, or additionally, the system 200 may be used to monitor changes in magnitude of dynamic strain of the housing. A change in magnitude of dynamic strain may indicate stretch, compression, elongation or shear of the production tubing 220 or casing 216, 218. The magnitude of dynamic strain may also indicate severity of the strain being applied to the production tubing 220 or casing 216, 218, for example, the larger the strain being applied to the production tubing 220 or casing 216, 218, the greater the magnitude of dynamic strain. It follows that the more severe the strain being applied at a particular location of the production tubing 220 or casing 216, 218, the more likely the production tubing 220 or casing 216, 218 will be compromised and fail in the future. The system 200 may be used to monitor cumulative strain in the wellbore 234 over time.

It is contemplated that any part of any aspect or embodiment discussed in this specification can be implemented or combined with any part of any other aspect or embodiment discussed in this specification.

For the sake of convenience, the exemplary embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

We claim:

1. A system for detecting dynamic strain of a housing, the system comprising:
   (a) an optical fiber comprising a first pair of fiber Bragg gratings (FBGs), wherein a first segment of the optical fiber extending between the first pair of FBGs is affixed entirely linearly along the housing and wherein the first pair of FBGs are tuned to reflect a first wavelength of laser light; and
   (b) an interrogator comprising a laser source and a photodetector, wherein the interrogator is configured to perform interferometry based on a phase difference resulting from a change in optical path length between a first FBG and a second FBG of the first pair of FBGs by shining laser light at the first wavelength along the optical fiber and detecting light reflected by the first pair of FBGs, and wherein the interrogator outputs dynamic strain measurements based on interferometry performed on the reflected light.

2. The system of claim 1, wherein the housing is a pipeline.

3. The system of claim 1, wherein the optical fiber is enclosed in a protective shell.

4. The system of claim 3, wherein the protective shell comprises a metal tube.

5. The system of claim 1, wherein the optical fiber further comprises a second pair of FBGs, wherein a second segment of the optical fiber extending between the second pair of FBGs is affixed entirely linearly along the housing and wherein the interrogator is further configured to perform interferometry by shining laser light along the optical fiber and detecting light reflected by the second pair of FBGs, wherein a third segment of the optical fiber connects the first and second segments of optical fiber and wherein the first, second, and third segments are collinear.

6. The system of claim 5, wherein the second pair of FBGs are tuned to reflect a second wavelength of laser light different than the first wavelength, and wherein the interrogator is configured to perform interferometry using the second pair of FBGs by shining laser light at the second wavelength along the optical fiber and applying wavelength division multiplexing.

7. The system of claim 5, wherein the second pair of FBGs are tuned to reflect the first wavelength, and wherein the interrogator is configured to perform interferometry using the second pair of FBGs by shining laser light at the first wavelength along the optical fiber and applying time division multiplexing.

8. The system of claim 1, wherein the interrogator is configured to:
   (a) shine a reference light pulse and a sensing light pulse along the optical fiber, the reference light pulse being delayed compared to the sensing light pulse by a predetermined period of time selected such that the reference light pulse reflected by the first FBG of the first pair of FBGs interferes with the sensing light pulse reflected by the second FBG of the first pair of FBGs to form a combined interference pulse;
   (b) detect the combined interference pulse; and
   (c) detect as the phase difference a difference in phase between the reflected reference light pulse and the reflected sensing light pulse of the combined interference pulse to produce the dynamic strain measurements.

9. The system of claim 1, wherein the interrogator is further configured to process the measurements to estimate where along the housing the dynamic strain is occurring.

10. The system of claim 1, wherein the interrogator is further configured to process the measurements to estimate magnitude of the dynamic strain.

11. The system of claim 1, wherein the interrogator is further configured to process the measurements to monitor changes in frequency of the dynamic strain.

* * * * *